United States Patent
Yamaguchi

(10) Patent No.: US 11,047,786 B2
(45) Date of Patent: Jun. 29, 2021

(54) APPARATUS AND METHOD FOR MEASURING PARTICLE SIZE DISTRIBUTION, AND PROGRAM FOR PARTICLE SIZE DISTRIBUTION MEASURING APPARATUS

(71) Applicant: HORIBA, LTD., Kyoto (JP)

(72) Inventor: Tetsuji Yamaguchi, Kyoto (JP)

(73) Assignee: HORIBA, LTD., Kyoto (JP)

(*) Notice: Subject to any disclaimer, the term of this patent is extended or adjusted under 35 U.S.C. 154(b) by 0 days.

(21) Appl. No.: 16/461,511

(22) PCT Filed: Oct. 30, 2017

(86) PCT No.: PCT/JP2017/039151
§ 371 (c)(1),
(2) Date: May 16, 2019

(87) PCT Pub. No.: WO2018/092573
PCT Pub. Date: May 24, 2018

(65) Prior Publication Data
US 2019/0346354 A1 Nov. 14, 2019

(30) Foreign Application Priority Data
Nov. 16, 2016 (JP) .............................. JP2016-223373

(51) Int. Cl.
*G01N 15/02* (2006.01)
(52) U.S. Cl.
CPC ..... *G01N 15/0211* (2013.01); *G01N 15/0255* (2013.01); *G01N 2015/0222* (2013.01)
(58) Field of Classification Search
CPC .......... G01N 15/0211; G01N 15/0255; G01N 2015/0222; G01N 2015/045;
(Continued)

(56) References Cited

U.S. PATENT DOCUMENTS 7,294,513 B2 * 11/2007 Wyatt ................ G01N 15/0255
356/338
9,074,980 B2 * 7/2015 Yoon .................. G01N 21/6458
(Continued)

FOREIGN PATENT DOCUMENTS

JP 02-031133 A 2/1990
JP 08-143315 A 6/1996
(Continued)

OTHER PUBLICATIONS

International Search Report dated Dec. 12, 2017 for International Application No. PCT/JP2017/039151 and English translation.

*Primary Examiner* — Mohamed K Amara
(74) *Attorney, Agent, or Firm* — Lucas & Mercanti, LLP

(57) ABSTRACT

The particle size distribution measuring apparatus includes a centrifugal sedimentation measuring mechanism and a dynamic light scattering measuring mechanism. The centrifugal sedimentation measuring mechanism causes particles to settle out by rotating a measurement cell accommodating particles dispersed in a dispersion medium and detects transmitted light by irradiating light to the measurement cell to measure a first particle size distribution on a basis of a change of transmitted light intensity of the transmitted light. The dynamic light scattering measuring mechanism detects scattered light occurred upon irradiation of light to particles so as to measure a second particle size distribution based on a change of scattered light intensity of the scattered light occurred due to Brownian motion of particles. After the centrifugal sedimentation measuring mechanism detects the transmitted light, the dynamic light scattering measuring mechanism measures the second particle size distribution by irradiating light onto the measurement cell.

12 Claims, 9 Drawing Sheets

(58) Field of Classification Search
CPC ......... G01N 15/042; G01N 2015/0053; G01N 15/0205; G01N 15/06; G01N 15/05; G01N 2015/0693; G01N 2015/0065; G01N 2015/1486; G01N 21/51; G01N 15/02; G01N 2015/0288; G01N 33/491; G01N 2015/1493; G01N 2001/2223; G01N 2015/0216; G01N 2015/149; G01N 2015/1087; G01N 21/07; G01N 21/47; B01L 2200/0652; B01L 2400/0409; B01L 3/5021

See application file for complete search history.

(56) References Cited

U.S. PATENT DOCUMENTS

| | | | |
|---|---|---|---|
| 2003/0096302 A1* | 5/2003 | Yguerabide | G01N 15/1468 435/7.1 |
| 2004/0017568 A1* | 1/2004 | Wyatt | B01L 3/5025 356/338 |
| 2007/0206203 A1 | 1/2007 | Finn | |
| 2007/0155017 A1* | 7/2007 | Wyatt | G01N 15/0255 436/45 |
| 2008/0293154 A1* | 11/2008 | Makiuchi | G01N 21/6428 436/172 |
| 2010/0231909 A1* | 9/2010 | Trainer | G01N 15/042 356/336 |
| 2010/0285989 A1* | 11/2010 | Huo | G01N 33/54346 506/9 |
| 2011/0019187 A1* | 1/2011 | Mizukami | G01N 15/0205 356/335 |
| 2011/0181869 A1 | 1/2011 | Tsai | |
| 2011/0257298 A1 | 2/2011 | Yamazaki | |
| 2011/0104743 A1* | 5/2011 | Maurer | G01N 15/05 435/34 |
| 2014/0096598 A1* | 4/2014 | Halverson | C12Q 1/02 73/61.72 |
| 2014/0226158 A1* | 8/2014 | Trainer | G01J 3/0218 356/336 |
| 2017/0059471 A1* | 3/2017 | Wachemig | G02B 21/06 |

FOREIGN PATENT DOCUMENTS

| | | |
|---|---|---|
| JP | 11-108822 A | 4/1999 |
| JP | 2001-337028 A | 12/2001 |
| JP | 2006-098212 A | 4/2006 |
| JP | 2014-021060 A | 2/2014 |
| JP | 2014521967 A | 8/2014 |
| WO | 2010/035775 A | 4/2010 |
| WO | 2010/073772 A | 7/2010 |

* cited by examiner

APPARATUS AND METHOD FOR MEASURING PARTICLE SIZE DISTRIBUTION, AND PROGRAM FOR PARTICLE SIZE DISTRIBUTION MEASURING APPARATUS

CROSS REFERENCE TO RELATED APPLICATION

This Application is a 371 of PCT/JP2017/039151 filed on Oct. 30, 2017 which, in turn, claimed the priority of Japanese Patent Application No. 2016-223373 filed on Nov. 16, 2016, both applications are incorporated herein by reference.

FIELD OF THE INVENTION

The present invention relates to a particle size distribution measuring apparatus, a particle size distribution measuring method, and a program for a particle size distribution measuring apparatus.

BACKGROUND ART

As a particle size distribution measuring apparatus, there has conventionally been one using dynamic light scattering method which includes detecting scattered light occurred by light irradiation to particles, and measuring a particle size distribution on the basis of fluctuations in the scattered light caused by Brownian motion of particles.

The measurement with the dynamic light scattering method has an advantage that it is possible to measure a particle size distribution of a nano-order particles. However, because a particle size makes a significant influence on scattered light intensity, there is a disadvantage that the presence of small particles becomes unobservable due to scattering of large particles, thus making it difficult to carry out particle size distribution measurement in a wide range of particle sizes as described in Patent Document 1.

As a measuring method different from the above dynamic light scattering method, there is centrifugal sedimentation method which includes causing particles to settle out by rotating a measurement cell accommodating particles dispersed in a dispersion medium, and measuring a particle size distribution on the basis of a transmitted light intensity change obtainable by irradiating light onto the measurement cell.

The measurement with the centrifugal sedimentation method has an advantage that it is possible to measure a particle size distribution in a relatively wide range of particle sizes. There is, however, a disadvantage that particles having a fine particle size (for example, 10 nm or less) are significantly influenced by Brownian motion and the particles do not settle out due to balance between sedimentation velocity and Brownian motion velocity. It is therefore difficult to measure a particle size distribution for a fine particle size.

As a method of causing fine particles to settle out, it is conceivable to increase a rotation speed of the measurement cell. Even with this method, heat of a motor for rotating the measurement cell and air scour in a rotating disk provided with the measurement cell may lead to a temperature rise in the measurement cell and then a change in viscosity of the dispersion medium, resulting in a measurement error. It is consequently difficult to accurately measure the particle size distribution for the fine particle size. Even if the rotation speed is increased, it takes a long period of time to cause fine particles to settle out, thus making it difficult to reduce measurement time.

The above measurement methods have been used so far for different purposes. The dynamic light scattering method is used when desired to know a particle size distribution relative to a monodispersed sample of fine particles. The centrifugal sedimentation method is used when desired to know a particle size distribution relative to a multidispersed sample (sample containing particles in a relatively wide particle size range).

PRIOR ART DOCUMENT

Patent Document

Patent Document 1: Japanese Unexamined Patent Publication No. 2014-521967

SUMMARY OF THE INVENTION

Problems to be Solved by the Invention

The present invention has for its main object to provide a particle size distribution measuring apparatus capable of highly accurately measuring a particle size distribution in a wide range of particle sizes including fine particle sizes in a short period of time.

Means of Solving the Problems

In one of embodiments of the present invention, a particle size distribution measuring apparatus includes a centrifugal sedimentation type measuring mechanism and a dynamic light scattering type measuring mechanism. The centrifugal sedimentation type measuring mechanism is designed to cause particles to settle out by rotating a measurement cell accommodating particles dispersed in a dispersion medium, and is designed to detect transmitted light by irradiating light to the particles so as to measure a first particle size distribution on the basis of a change of transmitted light intensity of the transmitted light. The dynamic light scattering type measuring mechanism is designed to detect scattered light occurred upon irradiation of light to particles so as to measure a second particle size distribution on the basis of a change of scattered light intensity of the scattered light occurred due to Brownian motion of particles. After the centrifugal sedimentation type measuring mechanism detects the transmitted light, the dynamic light scattering type measuring mechanism measures the second particle size distribution by irradiating light onto the measurement cell.

With the above particle size distribution measuring apparatus, the centrifugal sedimentation type measuring mechanism is first capable of measuring a particle size distribution in a relatively wide range of particle sizes as a first particle size distribution. Then, in the measurement cell after the centrifugal sedimentation type measuring mechanism detects transmitted light, relatively large particles that appear in the first particle size distribution have already settled out and fine particles are dispersed in the dispersion medium.

Consequently, in a state in which the relatively large particles are separated from the fine particles, the dynamic light scattering type measuring mechanism measures a particle size distribution for the fine particles as a second particle size distribution. It is thus possible to highly accurately measure the particle size distribution in the wide range of particle sizes including the fine particle sizes in a short period of time.

The apparatus further includes a controller to control the centrifugal sedimentation type measuring mechanism and the dynamic light scattering type measuring mechanism. The controller preferably includes a first measurement end determination section and a second measurement start section. The first measurement end determination section is designed to make a determination whether measurement of the first particle size distribution is terminated, on the basis of the transmitted light intensity obtainable by the centrifugal sedimentation type measuring mechanism. The second measurement start section is designed to transmit, to the dynamic light scattering type measuring mechanism, a second measurement start signal for starting measurement of the second particle size distribution after the first measurement end determination section makes a determination that the measurement of the first particle size distribution is terminated.

With the above controller, it is possible to achieve an automatic determination as to whether the measurement of the first particle size distribution is terminated, and an automatic start of the measurement of the second particle size distribution after the measurement of the first particle size distribution is terminated.

If the second particle size distribution is measured after the rotation of the measurement cell is interrupted upon termination of the measurement of the first particle size distribution, the particles settled out by the centrifugal sedimentation type measuring mechanism may refloat.

Hence, the centrifugal sedimentation type measuring mechanism preferably includes a rotation mechanism to rotate the measurement cell around a rotation axis. The controller preferably causes the rotation cell to rotate by transmitting a control signal to the rotation mechanism when measuring the second particle size distribution.

With this configuration, the second particle size distribution is measurable while preventing refloat of the particles settled out by the centrifugal sedimentation type measuring mechanism.

When the measurement cell is rotated during the measurement of the second particle size distribution as described above, for example, vibration in the measurement cell and stray light from the measurement cell may affect the detection of scattered light intensity.

Preferably, the rotation mechanism is designed to rotate a reference cell accommodating the dispersion medium, and the dynamic light scattering type measuring mechanism detects background light occurred upon irradiation of light onto the reference cell, and calculates a second particle size distribution on the basis of a change of background light intensity of the background light and a change of the scattered light intensity.

With this configuration, it is possible to eliminate influence of the rotation of the measurement cell, thus leading to a more highly accurate calculation of the second particle size distribution.

A rotation speed of the measurement cell during measurement of the second particle size distribution is preferably lower than a rotation speed of the measurement cell during measurement of the first particle size distribution.

With this configuration, by decreasing the rotation speed of the measurement cell after the measurement of the first particle size distribution is terminated, a temperature rise in the measurement cell and variation in viscosity of the dispersion medium due to the temperature rise can be reduced to more accurately measure the second particle size distribution.

The following is one of specific embodiments for the first particle size distribution measurement to the second particle size distribution measurement. That is, a first measurement data acceptance section accepts transmitted light intensity data indicating transmitted light intensity obtainable from the centrifugal sedimentation type measuring mechanism. The first measurement end determination section makes a determination that the measurement of the first particle size distribution is terminated when the transmitted light intensity reaches a predetermined threshold value or more, or when absorbance obtainable on the basis of the transmitted light intensity reaches a predetermined threshold value or less.

In order to design so that a user can check a particle size distribution in the wide range of particle sizes including the fine particle sizes, each of the first particle size distribution and the second particle size distribution is preferably indicated on a graph whose one axis is particle size and whose other axis is a ratio of particles for each particle size relative to a total of particles. It is preferable to further include a distribution composition section to create a composed particle distribution indicated on an identical graph by composing the first particle size distribution and the second particle size distribution.

It is preferable to include a particle concentration calculation section and a distribution conversion section. The particle concentration calculation section calculates a concentration of particles having a particle size indicated on the first particle size distribution on the basis of the transmitted light intensity obtainable by the centrifugal sedimentation type measuring mechanism. On the basis of the concentration calculated by the particle concentration calculation section, the distribution conversion section converts a composed particle size distribution composed by the distribution composition section, from a distribution relatively indicating a particle number for each particle size to a distribution absolutely indicating each particle number.

With the above configuration, it is possible to know absolute particle numbers, such as actual number concentration and volume concentration at a digit matching level, with respect to a wide range of particle sizes including fine particle sizes.

The measurement cell preferably accommodates a plurality of dispersion mediums which are stacked one upon another along a sedimentation direction and have densities different from one another.

With the use of the above measurement cell, a density gradient occurs in the dispersion medium in the measurement cell. It is therefore possible to cause particles having various particle sizes to sequentially settle out as a layer-shaped particles having a uniform particle size. This leads to improved optical resolution by the centrifugal sedimentation type measuring mechanism.

In one of embodiments of the present invention, a particle size distribution measuring method includes using a centrifugal sedimentation type measuring mechanism and a dynamic light scattering type measuring mechanism. The centrifugal sedimentation type measuring mechanism is designed to cause particles to settle out by rotating a measurement cell accommodating particles dispersed in a dispersion medium, and designed to detect transmitted light by irradiating light to the particles so as to measure a first particle size distribution on the basis of a change of transmitted light intensity of the transmitted light. The dynamic light scattering type measuring mechanism is designed to detect scattered light occurred upon irradiation of light to particles so as to measure a second particle size distribution on the basis of a change of scattered light intensity of the scattered light occurred due to Brownian motion of particles. The second particle size distribution is measured by detecting the transmitted light with use of the centrifugal sedimentation type measuring mechanism, followed by irradiating light onto the measurement cell with use of the dynamic light scattering type measuring mechanism.

In one of embodiments of the present invention, a program applied to a particle size distribution measuring apparatus is provided. The apparatus includes a centrifugal sedimentation type measuring mechanism and a dynamic light scattering type measuring mechanism. The centrifugal sedimentation type measuring mechanism is designed to cause particles to settle out by rotating a measurement cell accommodating particles dispersed in a dispersion medium, and designed to detect transmitted light by irradiating light to the particles so as to measure a first particle size distribution on the basis of a change of transmitted light intensity of the transmitted light. The dynamic light scattering type measuring mechanism is designed to detect scattered light occurred upon irradiation of light to particles so as to measure a second particle size distribution on the basis of a change of scattered light intensity of the scattered light occurred due to Brownian motion of particle. The second particle size distribution is designed to be measured by detecting the transmitted light with use of the centrifugal sedimentation type measuring mechanism, followed by irradiating light onto the measurement cell with use of the dynamic light scattering type measuring mechanism. The program is designed to cause a computer to perform functions that serve as a first measurement end determination section and a second measurement start section. The first measurement end determination section is designed to make a determination whether measurement of the first particle size distribution is terminated, on the basis of the transmitted light intensity obtainable by the centrifugal sedimentation type measuring mechanism. The second measurement start section is designed to transmit, to the dynamic light scattering type measuring mechanism, a second measurement start signal for starting measurement of the second particle size distribution after the first measurement end determination section makes a determination that measurement of the first particle size distribution is terminated.

The above particle size distribution measuring method and the above program for the particle size distribution measuring apparatus are capable of achieving the same operation and effect as the above particle size distribution measuring apparatus.

Effects of the Invention

With the present invention thus configured, a particle size distribution in the wide range of particle sizes including the fine particle sizes can be highly accurately measured in a short period of time.

DESCRIPTION OF REFERENCE NUMERAL

Figure 1:
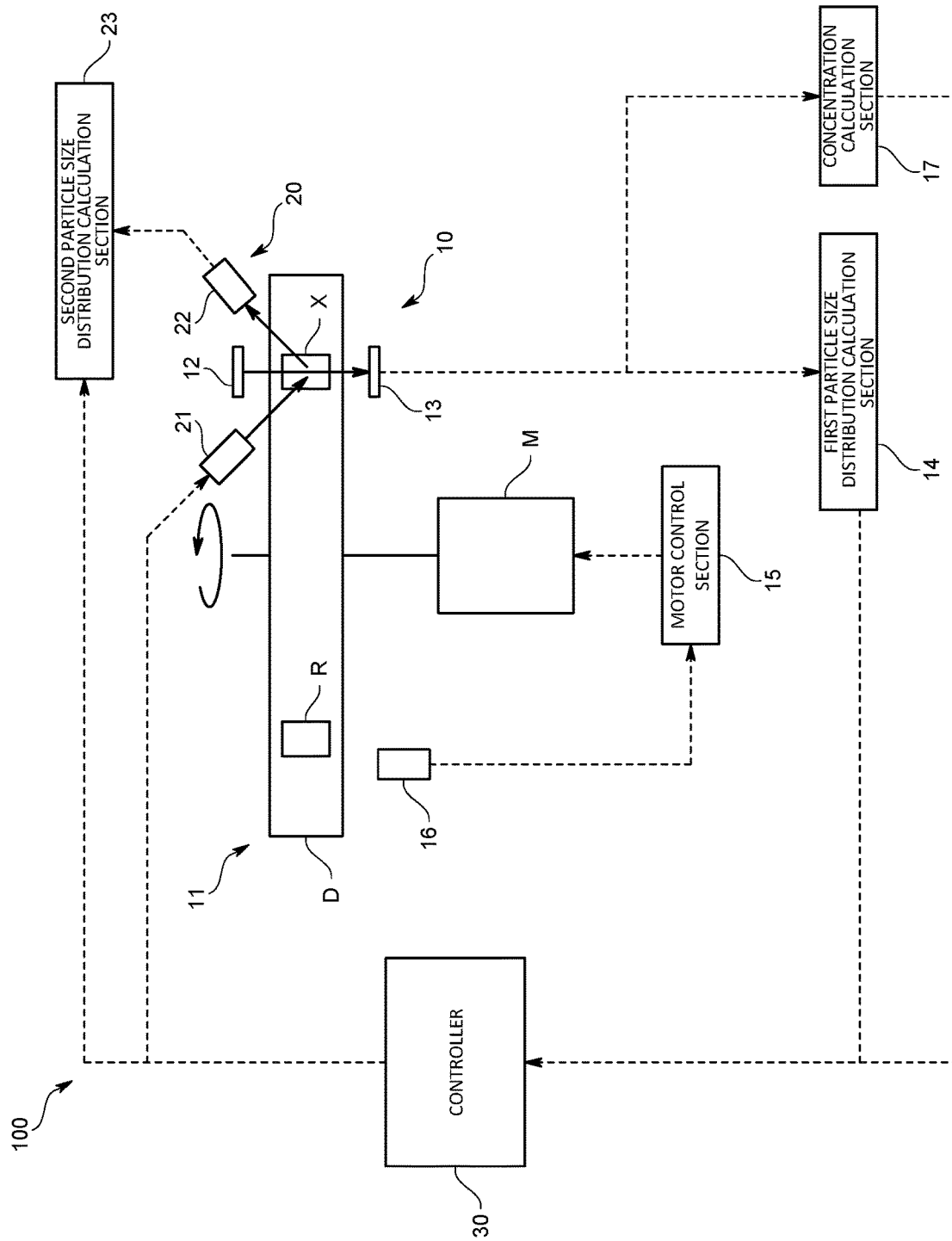
FIG. 1 is a schematic diagram illustrating a particle size distribution measuring apparatus in one of embodiments of the present invention.

100 particle size distribution measuring apparatus
10 centrifugal sedimentation type measuring mechanism
11 rotation mechanism
X measurement cell
R reference cell
20 dynamic light scattering type measuring mechanism
30 controller
31 first measurement start section
32 first measurement end determination section
33 first measurement interruption section
34 second measurement start section

DESCRIPTION OF THE EMBODIMENTS

One of embodiments of a particle size distribution measuring apparatus in the present invention is described below with reference to the drawings.

The particle size distribution measuring apparatus 100 in the present embodiment is intended to measure a particle size distribution of particles contained in a measurement object, such as pharmaceuticals, foods, chemical industrial products, and bubbles and particles. As illustrated in FIG. 1, the particle size distribution measuring apparatus 100 includes a centrifugal sedimentation type measuring mechanism 10 that measures a particle size distribution with the use of centrifugal sedimentation method, a dynamic light scattering type measuring mechanism 20 that measures a particle size distribution with the use of dynamic light scattering method, and a controller 30 to control these mechanisms 10 and 20.

A measurement principle of the centrifugal sedimentation type measuring mechanism 10 is described below first.

Figure 2:
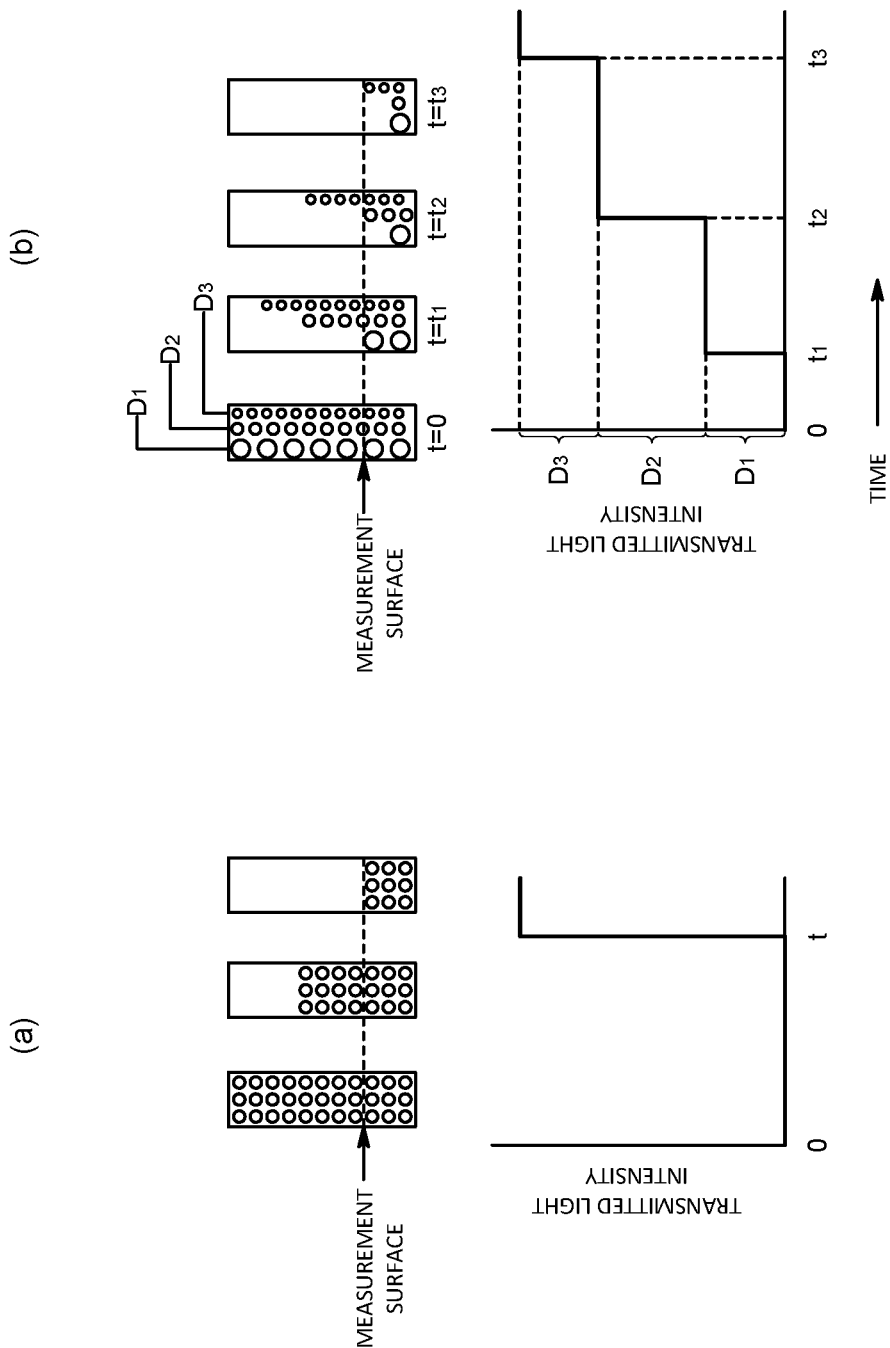
FIG. 2 is a diagram for describing a measurement principle of a centrifugal sedimentation type measuring mechanism in the above embodiment.

For example, when particles are allowed to float in a dispersion medium, such as water, particles sink down gradually. Sinking speed becomes higher with increasing a particle size (a diameter of a particle). When materials of particles and the dispersion medium are well known, a particle size is calculable by measuring time during which a particle sinks down a predetermined distance. Specifically, transmitted light is detected by irradiating light onto a measurement surface of the measurement cell X, and transmitted light intensity of the transmitted light and temporal variation of absorbance calculable from the transmitted light intensity are measured. Thus, when all the particles being dispersed have the same size as illustrated in FIG. 2(*a*), these particles sink down at the same sinking speed. Therefore, upon passage of a certain period of time after the sinking starts, the transmitted light intensity increases sharply. In this case, particles having different particle sizes coexist actually, and it appears as a composite of transmitted light intensity changes of the particles different in sinking time as illustrated in FIG. 2(b).

According to this principle, small particles have a low sinking speed and it takes time to measure. Hence, the centrifugal sedimentation type measuring mechanism 10 is intended to reduce sinking time by causing particles to sink down by using centrifugal-gravity instead of natural gravity.

Figure 3:
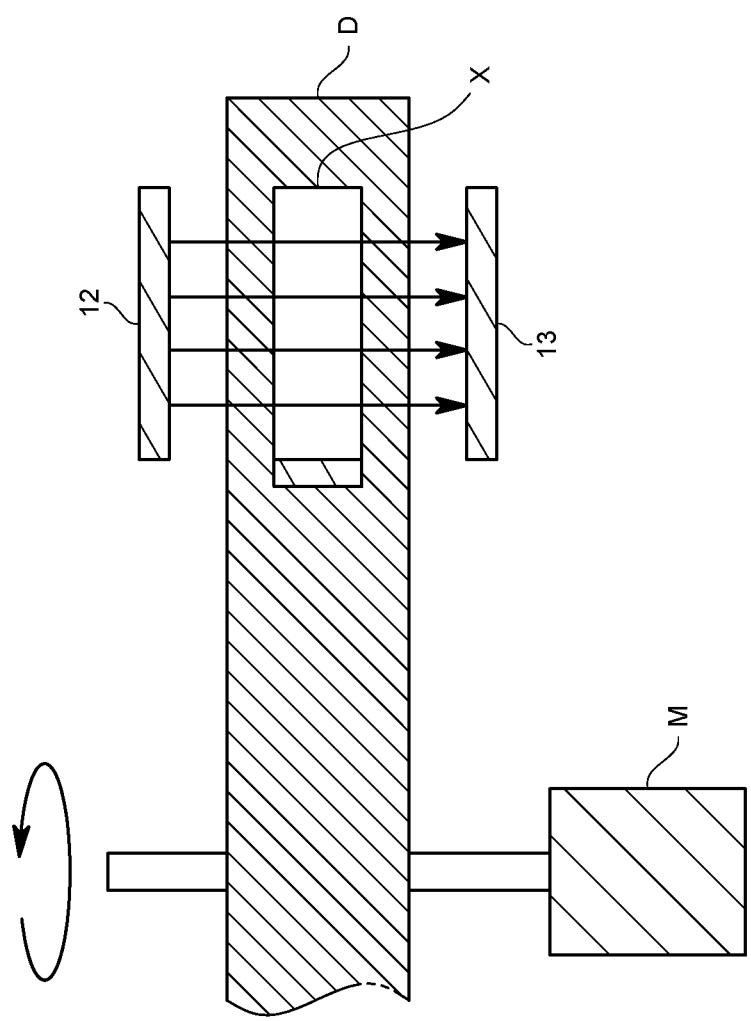
FIG. 3 is a schematic diagram for describing a first light source and a first light detector in the above embodiment.

Specifically, as illustrated in FIGS. 1 and 3, the centrifugal sedimentation measuring mechanism includes a rotation mechanism 11, a first light source 12, a first light detector 13, and a first particle size distribution calculation section 14. The rotation mechanism 11 rotates the measurement cell X. The first light source 12 irradiates light onto the measurement cell X. The first light detector 13 detects transmitted light of light from the first light source 12 which is already transmitted through the measurement cell X. The first particle size distribution calculation section 14 acquires a transmitted light intensity signal detected by the first light detector 13, and calculates a particle size distribution (hereinafter referred to as "a first particle size distribution") on the basis of the transmitted light intensity signal.

The rotation mechanism 11 includes a motor M, a rotating disk D secured to an output shaft of the motor M, and a motor control section 15 to control the motor M. The rotating disk D is designed to rotate in a state in which a surface plate part thereof is horizontal by using the output shaft of the motor M as a rotation axis.

The rotating disk D is provided with a measurement cell holder designed to receive the measurement cell X, and a reference cell holder designed to receive a reference cell R. The reference cell R accommodates a dispersion medium (namely, water) being identical to that accommodated in the measurement cell X.

Here, a position detector 16, such as an encoder to detect a position of the rotating disk D, is disposed. The motor control section 15 calculates a rotation speed of the rotating disk D by acquiring the position detection signal from the position detector 16, and performs feedback control for the motor M so that the rotation speed reaches a preset target rotation speed. The target rotation speed may be set to a certain rotation speed, or may be set so as to increase with time. That is, the motor control section 15 may be designed to cause the rotating disk D to be subjected to constant speed rotation or accelerated rotation.

The first light source 12 is designed to eject infrared-free light in order to prevent a temperature rise in the dispersion medium, and a blue LED and a green LED are used here. Although the first light source 12 may be a point light source or a surface light source, a line light source to eject line light along a centrifugal gravity direction, namely, a radial direction of the rotating disk D is employed in the present embodiment as illustrated in FIG. 3.

The first light detector 13 is disposed opposite to the first light source 12 with respect to the rotating disk D. The first light detector 13 is designed to detect transmitted lights ejected from the first light source 12 and passed through the measurement cell X and the reference cell R, and transmit a transmitted light intensity signal indicating transmitted light intensity of the transmitted light to the first particle size distribution calculation section 14. Although the first light detector 13 is a line sensor, a single light sensor may be used here.

The first light detector 13 is designed to detect the transmitted lights from the measurement cell X and the transmitted from the reference cell R in the present embodiment. For this purpose, a synchronizing signal generation LED (not illustrated) and a detector to detect light from the synchronizing signal generation LED are disposed to distinguish whether the transmitted light intensity signal detected by the first light detector 13 corresponds to the transmitted light passed through the measurement cell X or the reference cell R.

With the above configuration, the first particle size distribution calculation section 14 calculates the first particle size distribution on the basis of temporal variation of the transmitted light intensity signal detected by the first light detector 13. Alternatively, the first particle size distribution calculation section 14 may be configured to calculate the first particle size distribution on the basis of temporal variation of absorbance calculated using the transmitted light intensity signal.

Meanwhile, because the first light detector 13 detects the transmitted light intensity as described above, the centrifugal sedimentation type measuring mechanism 10 is capable of calculating a concentration of particles having a specific particle size that appear on the first particle size distribution (hereinafter referred to as "a specific particle size) on the basis of the transmitted light intensity. The centrifugal sedimentation type measuring mechanism 10 in the present embodiment therefore further includes a concentration calculation section 17 to calculate a concentration of particles having the specific particle size on the basis of transmitted light intensity of light passed through the measurement cell X which is detected by the first light detector 13. Examples of the above-mentioned concentration of the particles having the specific particle size include a number concentration indicating the number of particles having the specific particle size contained per unit volume, and a volume concentration indicating a volume occupied by particles having the specific particle size to a total volume.

The measurement principle of the dynamic light scattering type measuring mechanism 20 is subsequently described below.

Particles dispersed in a dispersion medium cause Brownian motion. A larger particle has a lower Brownian motion velocity, and a smaller particle has a higher Brownian motion velocity. Upon irradiation of light onto the particles causing Brownian motion, fluctuations corresponding to their respective Brownian motion velocities are observable in scatted light from the particles.

The dynamic light scattering type measuring mechanism 20 is therefore designed to irradiate light to particles and detect scattered light generated therefrom. The measuring mechanism 20 is also designed to generate autocorrelation data on the basis of temporal fluctuations of the scattered light and measure a particle size distribution (hereinafter referred to as "a second particle size distribution") by using the autocorrelation data.

Specifically, dynamic light scattering type measuring mechanism 20 includes a second light source 21, a second light detector 22, and a second particle size distribution calculation section 23 as illustrated in FIG. 1. The second light source 21 irradiates light onto the measurement cell X. The second light detector 22 detects scattered light generated by scattering of light from the second light source 21 due to particles in the measurement cell X. The second particle size distribution calculation section 23 acquires a scattered light intensity signal detected by the second light detector 22, and calculates a second particle size distribution on the basis of the scattered light intensity signal.

The second light source 21 is, for example, a semiconductor laser to eject laser beam, and is disposed to make it possible to irradiate light onto a rotation locus of the measurement cell X.

The second light source 21 is disposed on the same side as the foregoing first light source 12 with respect to the rotating disk D so that light from the second light source 21 can be irradiated onto the measurement cell X located at an irradiation position of light from the first light source 12.

The location of the second light source 21 may be suitably changed insofar as the light of the second light source 21 can be irradiated onto the measurement cell X mounted on the rotating disk D.

The second light detector 22 is, for example, a photomultiplier tube disposed on the same side as the second light source 21 with respect to the rotating disk X.

The location of the second detector may be suitably changed insofar as it is possible to detect scatted light due to particles in the measurement cell X, for example, on a side opposite to the second light source 21 with respect to the rotating disk D.

With the above configuration, the second particle size distribution calculation section 23 generates autocorrelation data on the basis of temporal fluctuations of the scattered light intensity signal detected by the second light detector 22, and calculates a second particle size distribution by applying predetermined arithmetic processing to the autocorrelation data.

The controller 30 is a general-purpose or special-purpose computer including a CPU, memory, and an input/output interface, and is intended to control operations of the centrifugal sedimentation type measuring mechanism 10 and the dynamic light scattering type measuring mechanism 20. The computer includes functions that serve as the motor control section 15, the first particle size distribution calculation section 14, the concentration calculation section 17 and the second particle size distribution calculation section 23 as described above in the present embodiment. Alternatively, one or more separate computers may include these functions.

The controller 30 is therefore configured to control the individual mechanisms in the present embodiment so that the dynamic light scattering type measuring mechanism 20 measures a second particle size distribution by irradiating light onto the measurement cell X after measuring the first particle size distribution.

Figure 4:
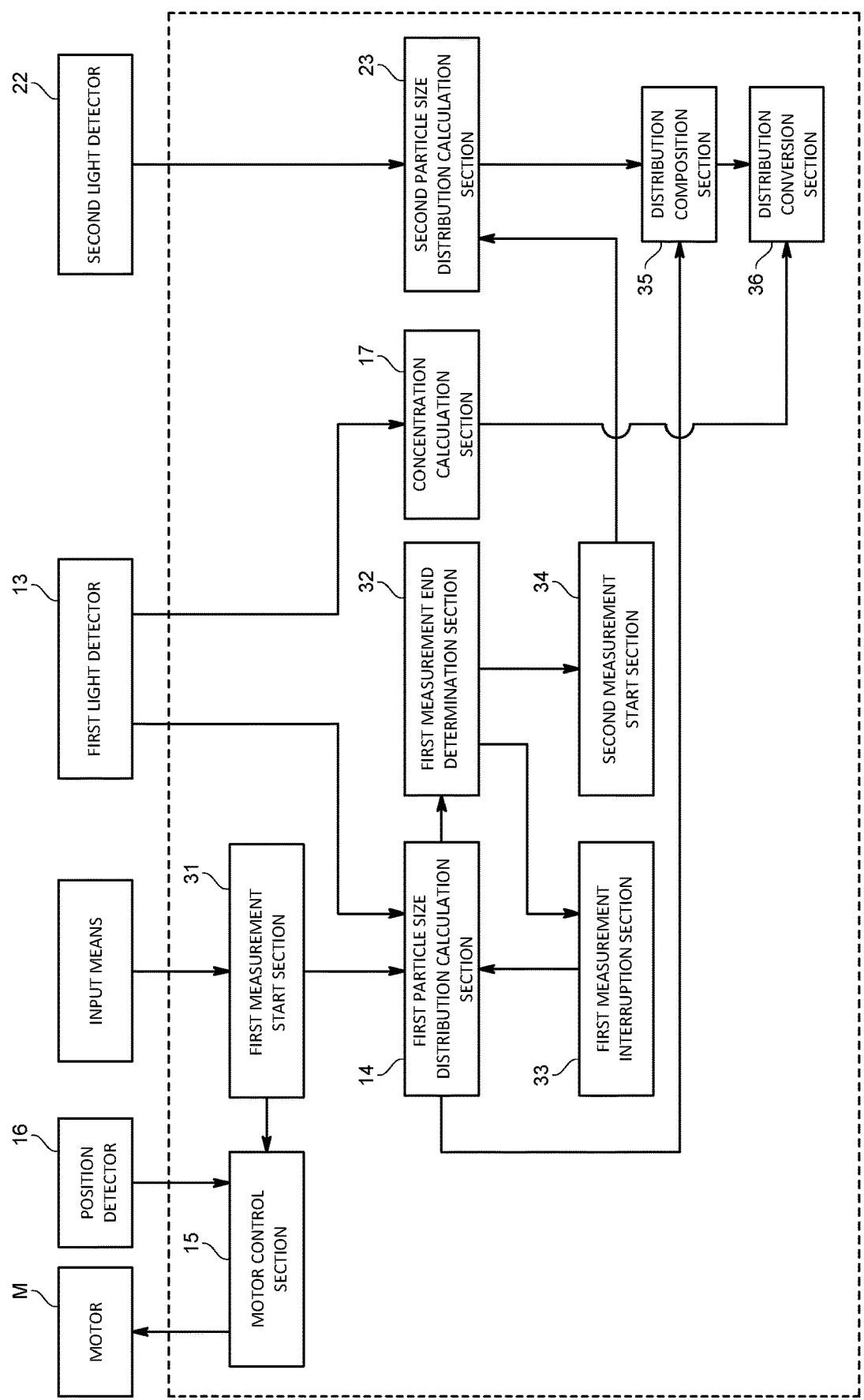
FIG. 4 is a functional block diagram illustrating functions of the particle size distribution measuring apparatus in the above embodiment.

Specifically, as illustrated in FIG. 4, the controller 30 includes functions that serve as at least a first measurement start section 31, a first measurement end determination section 32, a first measurement interruption section 33 and the second measurement start section 34 by causing the CPU and peripheral devices to cooperate with each other according to a predetermined program stored in a predetermined region of the memory.

Figure 5:
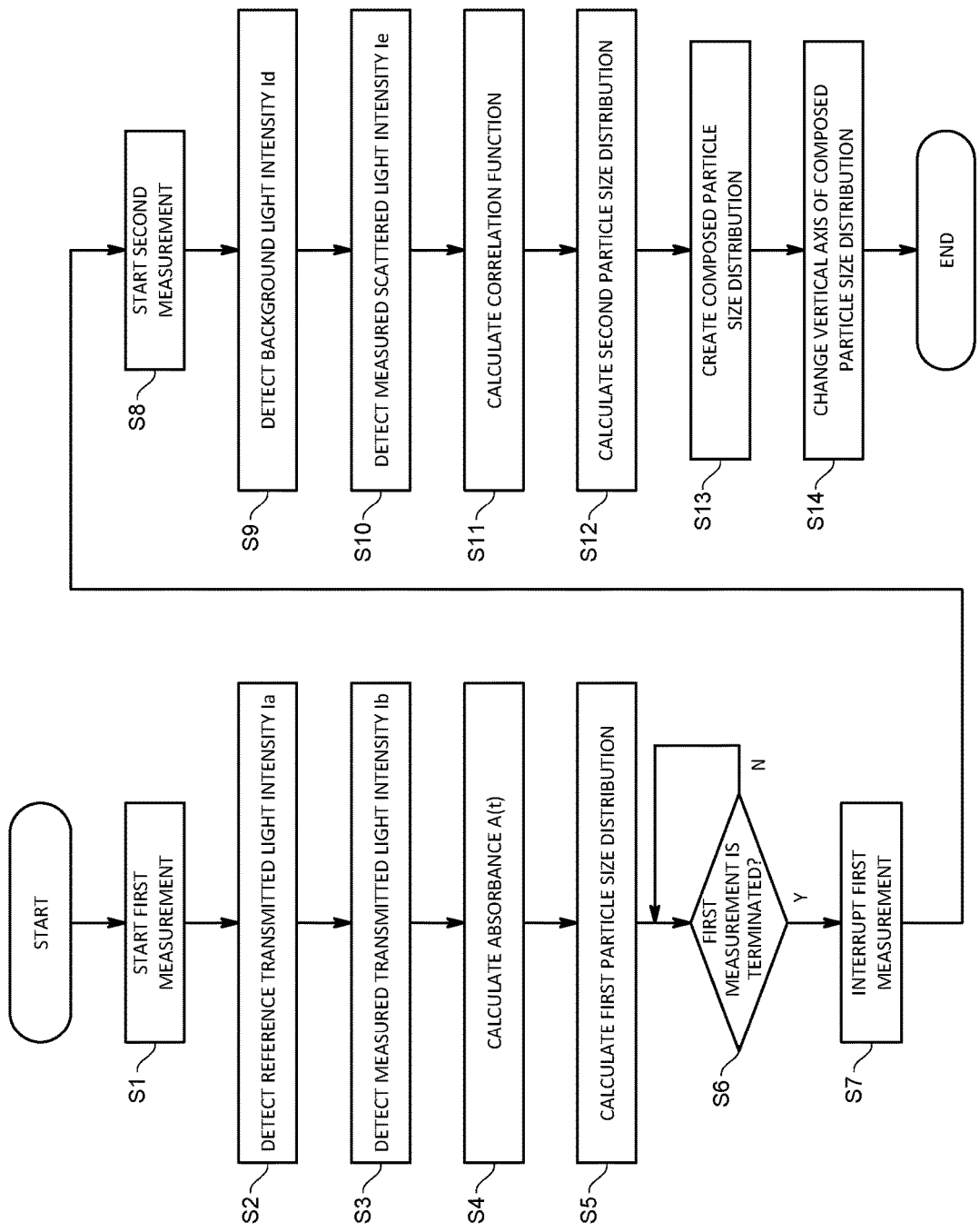
FIG. 5 is a flowchart illustrating operations of the particle size distribution measuring apparatus in the above embodiment.

With reference to a flowchart illustrated in FIG. 5, operations of the particle size distribution measuring apparatus 100 in the present embodiment are described along with descriptions of individual components.

For the sake of description for description, a boundary particle size that is a boundary between a particle size measurement range measured by the centrifugal sedimentation type measuring mechanism 10 and a particle size measurement range measured by the dynamic light scattering type measuring mechanism 20 is set to, for example, 10 nm. That is, the following is a description of the case where the centrifugal sedimentation type measuring mechanism 10 measures a particle size distribution of 10 nm or more as a first particle size distribution, and the dynamic light scattering type measuring mechanism 20 measures a particle size distribution of lees than 10 nm as a second particle size distribution. The boundary particle size is preferably determined in view of a lower limit value of particle sizes for which measurement accuracy of the centrifugal sedimentation type measuring mechanism 10 can be ensured, and an upper limit value of particle sizes for which measurement accuracy of the dynamic light scattering type measuring mechanism 20 can be ensured. Here, a boundary particle size is set so that a sedimentation velocity of particles having a boundary particle size calculable from, for example, Stokes' law becomes sufficiently smaller than Brownian motion velocity (average movement velocity) of particles having the boundary particle size calculable from, for example, Stokes-Einstein relation.

First, when a user inputs, for example, a measurement start signal by using input means, the first measurement start section 31 accepts the measurement start signal and starts measurement of a first particle size distribution (hereinafter referred to as "a first measurement") by transmitting a first measurement start signal for controlling to the centrifugal sedimentation type measuring mechanism 10 (S1).

More specifically, the first measurement start section 31 outputs a control signal to the motor control section 15 so as to cause the rotating disk D to rotate and cause light from the first light source 12 to be irradiated onto the measurement cell X, thereby causing the first particle size distribution calculation section 14 to calculate the first particle size distribution.

The following is a more detailed description of the calculation of the first particle size distribution. Reference transmitted light intensity Ia of transmitted light passed through the reference cell R is first detected (S2). The reference transmitted light intensity Ia needs to be detected at least once. Alternatively, it may be, for example, an average value of a plurality of detection results.

Subsequently, a measured transmitted light intensity Ib of transmitted light passed through the measurement cell X for each rotation of the rotating disk D is detected (S3). Absorbance A(t) against the measurement cell X is calculated on the basis of the individual measured transmitted light intensity Ib and the individual reference transmitted light intensity Ia (S4), and a first particle size distribution is calculated on the basis of temporal variation of the absorbance A(t) (S5). Here, the absorbance A(t) is calculated by equation: $A(t) = -\log(Ia/Ib)$.

As a different calculation method, a reference transmitted light intensity Ia and a measured transmitted light intensity Ib may be alternately detected for each rotation, and a first particle size distribution is calculated for each rotation, and absorbance A(t) against the measurement cell X is calculated for each rotation on the basis of the measured transmitted light intensity Ib and the reference transmitted light intensity Ia, and a first particle size distribution is calculated on the basis of temporal variation of the absorbance A(t).

After the first particle size distribution is thus calculated, the first measurement end determination section 32 determines whether the first particle size distribution measurement by the centrifugal sedimentation type measuring mechanism 10 (hereinafter referred to as "a first measurement") is terminated (S6). When a determination is made that the first measurement is terminated, the first measurement end determination section 32 outputs termination thereof to the first measurement interruption section 33 and the second measurement start section 34.

Specifically, the first measurement end determination section 32 is designed to make a determination of she termination of the first measurement on the basis of transmitted light intensity of transmitted light passed through the measurement cell X. That is, the first measurement end determination section 32 acquires absorbance A(t) against the measurement cell X, and makes a determination that the first measurement is terminated when the absorbance A(t) reaches a predetermined threshold value or less.

The threshold value is set to a value calculated on the basis of a boundary particle size and taken as absorbance A(t) ought to be obtained when particles having the boundary particle size (10 nm) have settled out.

Thus, at a point in time when the first measurement end determination section 32 has determined the termination of the first measurement, the first particle size distribution for particles having the boundary particle size or more enters a calculated state or a calculable state by the first particle size distribution calculation section 14.

After the determination is made that the first measurement is terminated, the first measurement interruption section 33 controls the centrifugal sedimentation type measuring mechanism 10 to interrupt the first measurement (S7). More specifically, the first measurement interruption section 33 outputs a control signal to at least the first particle size distribution calculation section 14 so as to interrupt the calculation of the first particle size distribution, and subsequently the first light source 12 is turned off to interrupt light irradiation.

The first measurement interruption section 33 need not immediately interrupt the first measurement after the determination is made that the first measurement is terminated. Alternately, the first measurement interruption section 33 may be designed to cause interruption of the first measurement after passage of a predetermined period of time from a start of a second measurement described later.

Also, when the determination is made that the first measurement is terminated, the second measurement start section 34 transmits a second measurement start signal to the dynamic light scattering type measuring mechanism 20, and control is carried out to start measurement of a second particle size distribution (hereinafter referred to as "a second measurement") (S8).

Specifically, the second measurement start section 34 causes irradiation of light from the second light source 21 onto the measurement cell X, and causes the second particle size distribution calculation section 23 to calculate the second particle size distribution.

More specifically, at least the particles having the boundary particle size (10 nm or more) are ought to settle out into the measurement cell X by the centrifugal sedimentation type measuring mechanism 10. Accordingly, particles having a size smaller than the boundary particle size are ought to be dispersed (floating) in a dispersion medium in the measurement cell X. The second light source 21 in the present embodiment is therefore disposed so as to irradiate light onto a region located more radially inward with respect to a region of sedimentation of particles having the boundary particle size in the measurement cell X (more specifically an irradiation position by the first light source 12, namely radially inward with respect to a measurement surface in FIG. 2). This makes it possible for the second measurement to calculate the second particle size distribution for particles smaller than the boundary particle size (10 nm).

The following is a more detailed description of the calculation of the second particle size distribution. Firstly, the light from the second light source 21 is irradiated onto the reference cell R so as to detect background light intensity Id detected by the second light detector 22 (S9).

Subsequently, measured scattered light intensity Ie due to scattering of particles in the measurement cell X is detected per rotation of the rotating disk D (S10). A cross-correlation function is obtained on the basis of temporal variation of the background light intensity Id and temporal variation of the measured scattered light intensity Ie (S11). A second particle size distribution is calculated by applying predetermined arithmetic processing to the cross-correlation function (S12).

As a different calculation method, background light intensity Id and measured scattered light intensity Ie are alternately detected for each rotation. A differential autocorrelation function is obtained by subtracting an autocorrelation function obtained on the basis of the temporal variation of the background light intensity Id, from an autocorrelation function obtained on the basis of the temporal variation of the measured scattered light intensity Ie. A second particle size distribution may be calculated by applying the predetermined arithmetic processing to the differential autocorrelation function.

Alternatively, the second particle size distribution may be calculated by applying the predetermined arithmetic processing to an autocorrelation function obtained on the basis of the temporal variation of the measured scattered light intensity, without detecting the background light intensity Id.

The cross-correlation function and the autocorrelation are obtainable by applying an arithmetic operation using a predetermined arithmetic expression to a detected value per predetermined period of time in the second light detector 22, namely the number of photons detected by the second light detector 22 per predetermined period of time.

In the case of continuously irradiating light onto the measurement cell, the predetermined period of time is, for example, gate time changeable by suitably setting a clock frequency.

Meanwhile, because the second light detector 22 uses the detected value for each rotation of the rotating disk D in the present embodiment as described above, the predetermined period of time is changeable by a rotation speed of the rotating disk D. In other words, a speed change of the rotating disk D becomes possible to perform the same function as a change of the lock frequency and a change of the gate time. The predetermined period of time is suitably changeable depending on a kind of the measurement object X or the like, for example, in such a manner that the rotating disk D is set to a higher rotation speed in a former half and the rotating disk D is set to a lower rotation speed in a latter half. The second particle size distribution calculation section 23 is also capable of acquiring a rotation speed of the rotating disk D and calculating the cross-correlation function or the autocorrelation function on the basis of the rotation speed in the present embodiment.

In the second measurement described above, the second measurement start section 34 transmits a control signal to the motor control section 15 so as to rotate the rotating disk D without interrupting the motor M.

More specifically, the second measurement start section 34 transmits a control signal to the motor control section 15 so as to cause the rotating disk D to rotate at a second target relation speed lower than a rotation speed during the first measurement.

The second target rotation speed is a preset speed, namely a speed to such a degree that at least particles having the boundary particle size do not refloat. In other words, a centrifugal sedimentation velocity of particles having the boundary particle size is set higher than the Brownian motion velocity of the particles having the boundary particle size.

Because the rotation speed of the rotating disk D is gradually increased to reach a target rotation speed in the first measurement, the second target rotation speed is set to a rotation speed lower than the rotation speed of the rotating disk D upon termination of the first measurement, namely the target rotation speed.

With the above configuration, at least the particle size distribution in terms of the boundary particle size or more (10 nm or more) is measured as a first particle size distribution in the first measurement, and a particle size distribution in terms of the boundary particle size or less (10 nm or less) is measured as a second particle size distribution in the second measurement.

The first particle size distribution and the second particle size distribution indicate an amount of particles having a certain particle size relative to a total amount on a graph whose one axis is particle size and whose other axis is percentage (ratio and frequency). In other words, these particle size distributions indicate a relative particle number of the particles having the certain particle size.

The controller 30 further includes functions that serve as a distribution composition section 35 and a distribution conversion section 36 in the present embodiment as illustrated in FIG. 4.

Figure 6:
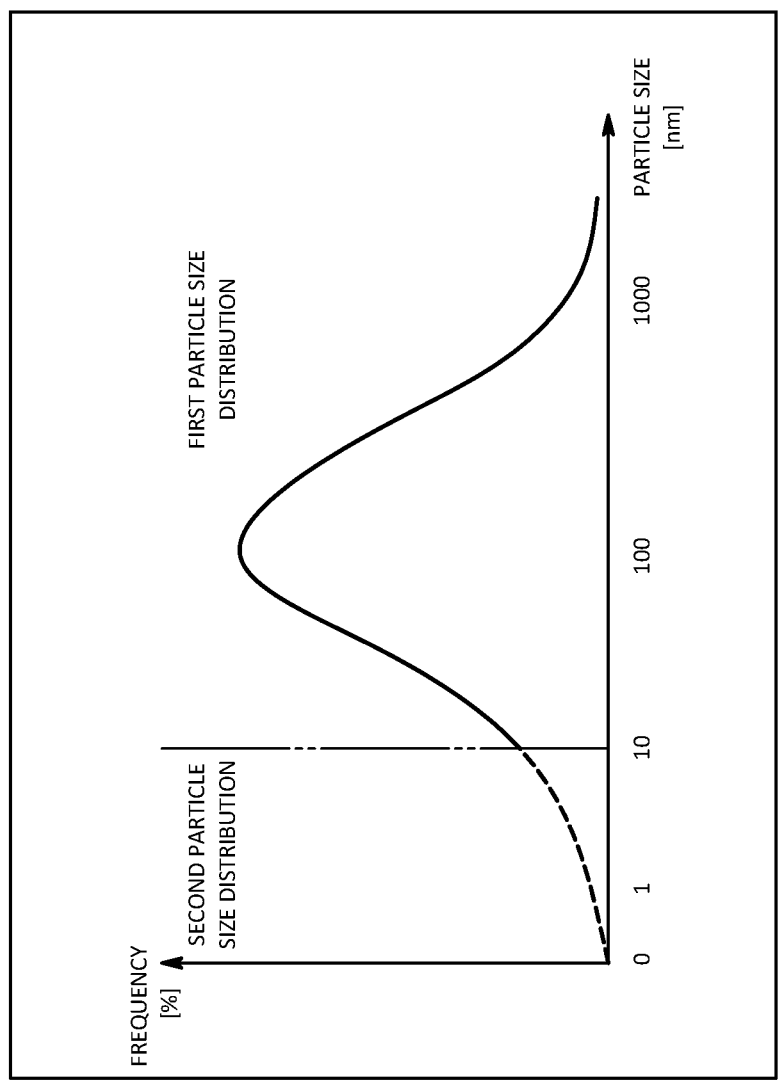
FIG. 6 is a schematic diagram indicating a first particle size distribution and a second particle size distribution in the above embodiment.

The distribution composition section 35 acquires first particle distribution data indicating a first particle size distribution calculated by the first particle size distribution calculation section 14, and second particle size distribution data indicating a second particle size distribution calculated by the second particle size distribution calculation section 23. The distribution composition section 35 creates a composed particle size distribution indicated on an identical graph by composing the first particle size distribution and the second particle size distribution as illustrated in FIG. 6 (S13).

The first particle size distribution and the second particle size distribution are composed to create the composed particle size distribution so that a value (percentage) of the other axis for a specific particle size in the first particle size distribution coincides with a value (percentage) of the other axis for a specific particle size in the second particle size distribution.

The distribution conversion section 36 is designed to convert the composed particle size distribution from a distribution relatively indicating a particle number for each particle size to a distribution absolutely indicating a particle number for each particle size. The distribution conversion section 36 converts the other axis in the distribution relatively indicating the particle number from percentage (frequency) to concentration (S14). The phrase that "the distribution absolutely indicating the particle number" denotes a distribution in which accuracy (for example, a digit matching level) desired for an indicated concentration is matched with an actual concentration, without limiting to a distribution in which the indicated concentration is completely matched with the actual concentration.

Specifically, the distribution conversion section 36 acquires a concentration of particles having a specific particle size from the concentration calculation section 17, and deforms a distribution shape of the composed particle size distribution so that the concentration of the other axis against the specific particle size matches with the concentration of the specific particle size calculated by the concentration calculation section 17.

Alternatively, the other axis is not limited to concentration, and it may be a total particle number for a specific particle size contained in the entirety of the measurement object X, or turbidity of particles having the specific particle size contained in the measurement object X.

With the particle size distribution measuring apparatus 100 in the present embodiment thus configured, the centrifugal sedimentation type measuring mechanism 10 is first capable of measuring a particle size distribution for a particle size in a relatively wide range of particle sizes as a first particle size distribution.

Subsequently, in a state in which relatively large particles are separated from fine particles by the centrifugal sedimentation type measuring mechanism 10, the dynamic light scattering type measuring mechanism is capable of measuring a particle size distribution for the fine particles as a second particle size distribution.

It is thus possible to highly accurately measure the particle size distribution in the wide range of particle sizes including fine particle sizes.

Additionally, because the measurement cell X is rotated in the second measurement, the second particle size distribution is measurable while preventing refloat of particles settled out by the centrifugal sedimentation type measuring mechanism 10.

Further, the threshold value that becomes a determination criteria for the first measurement end determination section 32 is set on the basis of the boundary particle size. Therefore, both of the centrifugal sedimentation type measuring mechanism 10 and the dynamic light scattering type measuring mechanism 20 are capable of highly accurately measuring the particle size distribution by determining the boundary particle size in view of the lower limit value of particle sizes at which it is possible to ensure the measurement accuracy of the centrifugal sedimentation type measuring mechanism 10, and the upper limit value of particle sizes at which it is possible to ensure measurement accuracy of the dynamic light scattering type measuring mechanism 20.

Furthermore, the second particle size distribution is calculated on the basis of the temporal variation of the measured scattered light intensity Ie and the temporal variation of the background light intensity Id in the second measurement. It is therefore possible to eliminate influence of the rotation of the measurement cell X on the measured scattered light intensity Ie (for example, influence of vibration due to the rotation of the measurement cell X and influence of stray light from the measurement cell). This leads to a more highly accurate calculation of the second particle size distribution.

The present invention is not limited to the above embodiments.

For example, although the rotation speed of the measurement cell in the second measurement is set lower than that in the first measurement, the second measurement may be carried out without changing the rotation speed of the measurement cell in the first measurement. Alternatively, the second measurement may be carried out in a state in which the rotation of the measurement cell is interrupted.

The first measurement end determination section in the above embodiment makes a determination that the first measurement is terminated when the absorbance A(t) against the measurement cell X reaches the threshold value or less. Alternatively, it may make the determination that the first measurement is terminated when the measured transmitted light intensity Ib or a difference between the reference transmitted light intensity Ia and the measured transmitted light intensity Ib reaches the predetermines threshold value or more, or when absorbance calculated using transmitted light intensity reaches the predetermined threshold value or less.

Still alternatively, the first measurement end determination section may make the determination that the first measurement is terminated when a predetermined period of time is elapsed after starting the first measurement. The predetermined period of time is preferably calculated from the boundary particle size by using, for example, a calculation formula, such as Stokes' equation. Specifically, it is conceivable that time required for sedimentation of particles having the boundary particle size is taken as the predetermined period of time.

Although the rotating disk is rotated in a state in which the surface plate part thereof is horizontal in the above embodiment, the rotating disk may be rotated in a state in which the surface plate part is inclined from a horizontal direction (for example, in a vertically standing state).

Figure 7:
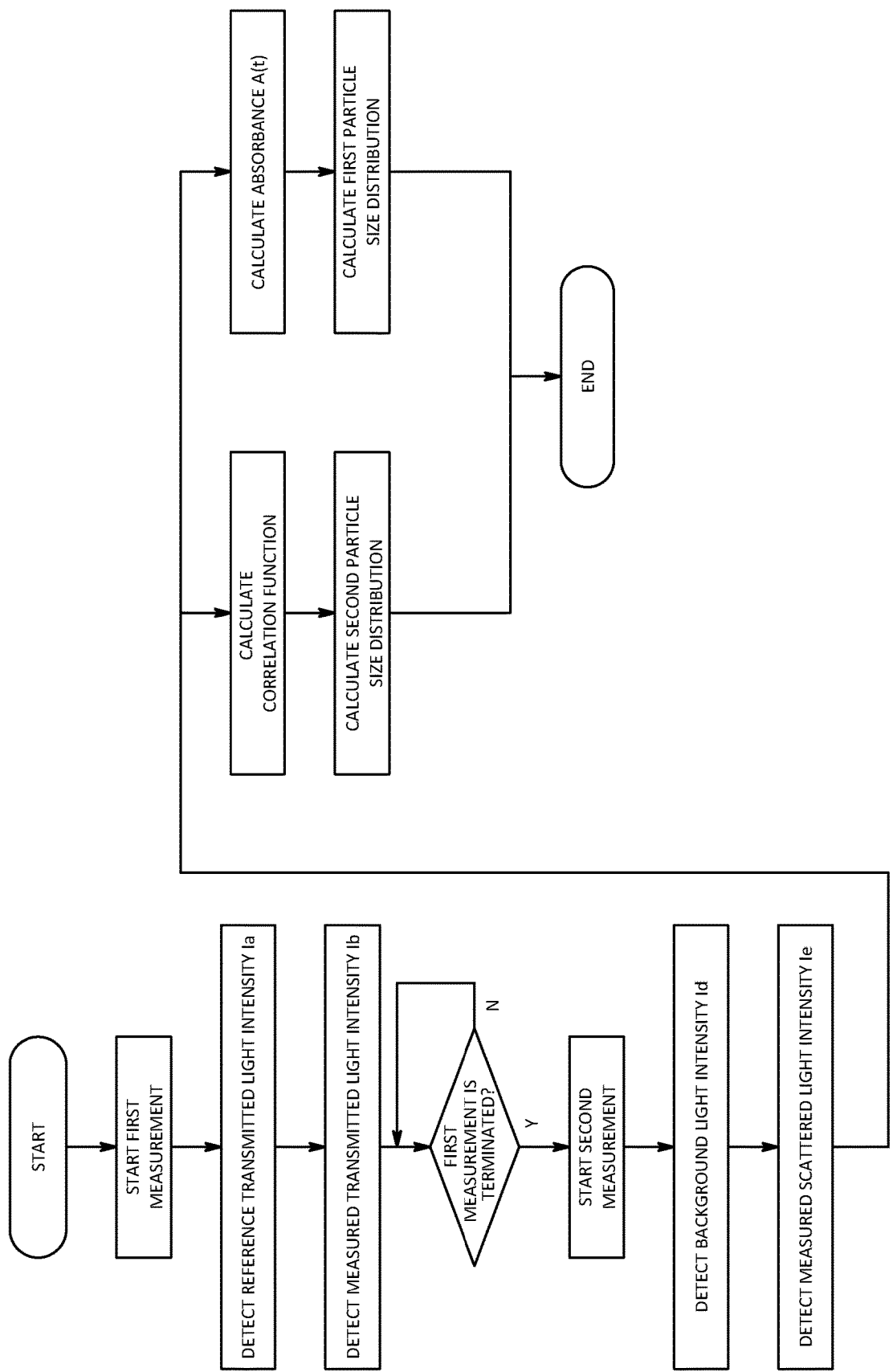
FIG. 7 is a flowchart illustrating operations of a particle size distribution measuring apparatus in other embodiment.

Although the second measurement is started after calculating the first particle size distribution in the above embodiment, the first particle size distribution may be calculated after the second measurement is started as illustrated in FIG. 7. That is, timing at which the first particle size distribution is calculated may be suitably changed insofar as the second measurement is designed to be started after the centrifugal sedimentation type measuring mechanism detects the reference transmitted light intensity and the measured transmitted light intensity.

Figure 8:
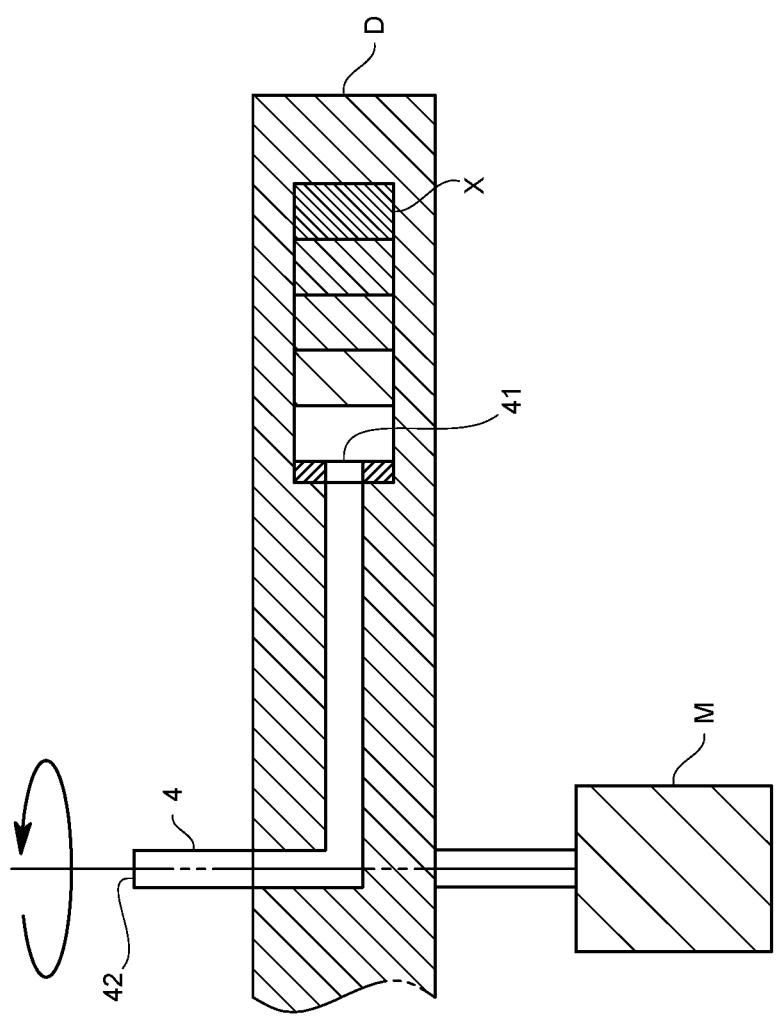
FIG. 8 is a schematic diagram for describing a measurement cell in other embodiment.

Although the above embodiment describes the case where the measurement cell accommodates water as a dispersion medium in the above embodiment, the measurement cell R may be designed to accommodate a plurality of kinds of dispersion mediums which are stacked one upon another along a sedimentation direction and have densities different from one another as illustrated in FIG. 8. The dispersion mediums are, for example, ones whose densities differs depending on concentration. Specific examples thereof include sucrose solution.

With the use of the above measurement cell R, a density gradient occurs in the dispersion medium in the measurement cell R. It is therefore possible to cause particles having various particle sizes to sequentially settle out as a layer shaped particles having a uniform particle size. This makes it possible to improve optical resolution by the centrifugal sedimentation type measuring mechanism 10. It is easy to wash away the dispersion medium because, before washing, it is only necessary to remove the measurement cell R from the measurement cell holder.

Alternatively, the particle size distribution measuring apparatus 100 in the present invention may further include a dispersion medium inlet tube 4, such as a tube, which permits loading of the dispersion medium into the measurement cell as illustrated in FIG. 8. One end opening of the dispersion medium inlet tube 4 communicates with the interior of the measurement cell X, and the other end opening 42 is disposed on the rotation axis of the rotating disk and opens in an axial direction. Thus, by allowing the other end opening to open in the axial direction on the rotation axis of the rotating disk, the position of the other end opening 42 remains unchanged even when the rotating disk D is rotated. Hence, by loading the dispersion medium into the other end opening 42, it is easy to load the dispersion medium into the measurement cell R without removing the measurement cell R from the rotating disk D.

Still alternatively, the particle size distribution measuring apparatus in the present invention may further include a fine particle ratio estimation section in which a ratio of particles smaller than a predetermined particle size relative to a total amount is estimated from a ratio of the particles having the predetermined particle size or more on the basis of a first particle size distribution measured by the centrifugal sedimentation type measuring mechanism.

Consequently, by setting a predetermined particle size to, for example, the boundary particle size (10 nm), a ratio of fine particles smaller than the boundary particle size relative to a total amount can be estimated without carrying out the second measurement by the dynamic light scattering type measuring mechanism upon termination of the first measurement by the centrifugal sedimentation type measuring mechanism.

Figure 9:
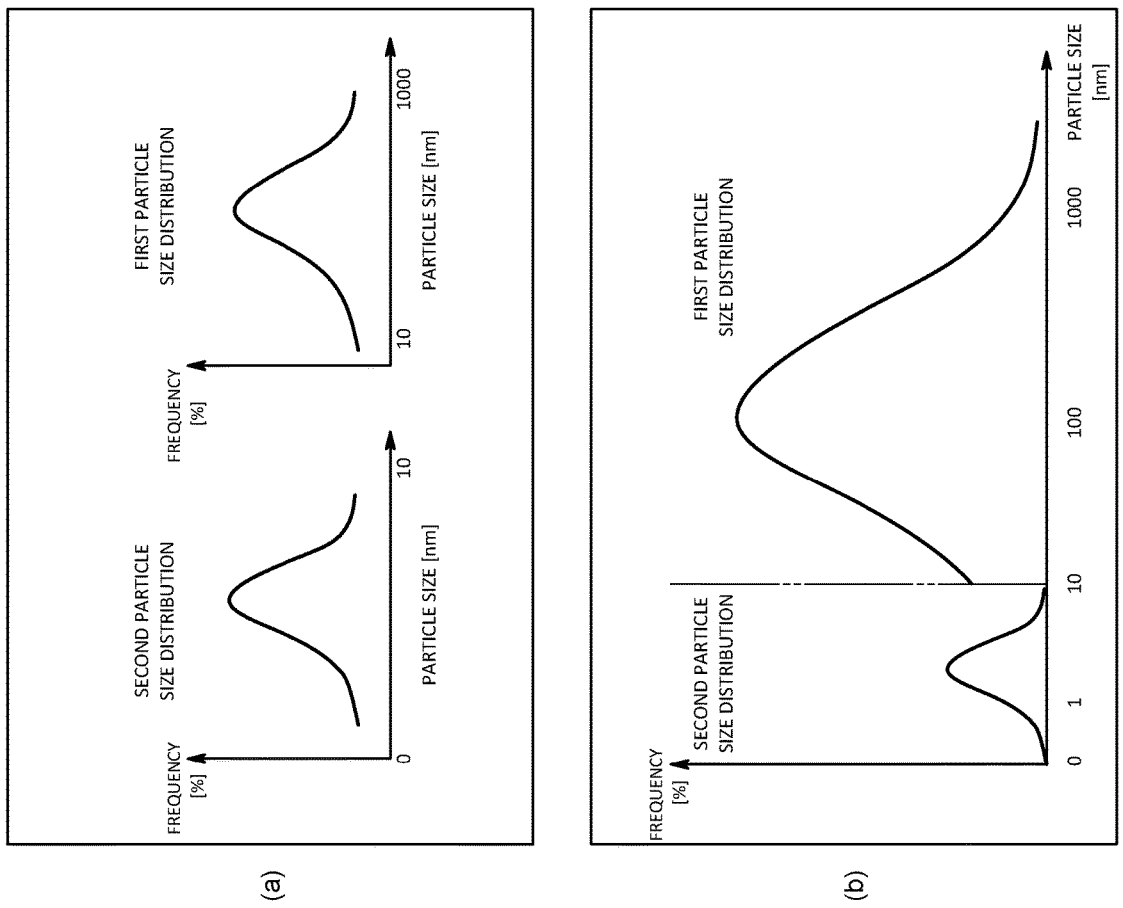
FIG. 9 is a schematic diagram indicating a first particle size distribution and a second particle size distribution in other embodiment.

Although the above embodiment has described the embodiment intended to compose the first particle size distribution and the second particle size distribution so as to be indicated on an identical graph, the first particle size distribution and the second particle size distribution may be displayed on an identical or different screens without being composed as illustrated in FIG. 9(a), or alternatively, the first particle size distribution and the second particle size distribution may be disposed on an identical graph without being composed. The second particle size distribution needs not necessarily be displayed. For example, a mean particle size of second particle size distributions, namely a mean particle size of particles having the boundary particle size or less may be indicated in numerical value.

Besides the above, it will be understood that the present invention is not limited to the above-described embodiments, individual component configurations may be combined together, and various modifications may be made without departing from the spirit and scope of the present invention.

INDUSTRIAL APPLICABILITY

The present invention is capable of highly accurately measuring particle size distributions in a wide range of particle sizes including fine particle sizes.

What is claimed is:

1. A particle size distribution measuring apparatus comprising:
   a centrifugal sedimentation type measuring mechanism causing particles to settle out by rotating a measurement cell accommodating particles dispersed in a dispersion medium and measuring a time during which a particle sinks down a predetermined distance by irradiating light to the particles and detecting transmitted light, wherein a first particle size distribution of the particles is measured on a basis of a change of transmitted light intensity of the transmitted light; and
   a dynamic light scattering type measuring mechanism detecting scattered light occurred upon irradiation of light to particles to measure a second particle size distribution on a basis of a change of scattered light intensity of the scattered light occurred due to Brownian motion of particles, wherein
   after the centrifugal sedimentation type measuring mechanism detects the transmitted light, the dynamic light scattering type measuring mechanism measures the second particle size distribution by irradiating light onto the measurement cell.

2. The particle size distribution measuring apparatus according to claim 1, further comprising:

a controller configured to control the centrifugal sedimentation type measuring mechanism and the dynamic light scattering type measuring mechanism, wherein
the controller comprises:
a first measurement end determination section determining whether measurement of the first particle size distribution is terminated, on a basis of the transmitted light intensity obtainable by the centrifugal sedimentation type measuring mechanism; and
a second measurement start section transmitting, to the dynamic light scattering type measuring mechanism, a second measurement start signal for starting measurement of the second particle size distribution after the first measurement end determination section makes a determination that the measurement of the first particle size distribution is terminated.

3. The particle size distribution measuring apparatus according to claim 2, wherein
the centrifugal sedimentation type measuring mechanism comprises a rotation mechanism configured to rotate the measurement cell around a rotation axis, and
the controller causes a rotation of the measurement cell by transmitting a control signal to the rotation mechanism, and
the dynamic light scattering type measuring mechanism measures the second particle size distribution during the rotation of the measurement cell.

4. The particle size distribution measuring apparatus according to claim 3, wherein
the rotation mechanism is configured to rotate a reference cell accommodating the dispersion medium, and
the dynamic light scattering type measuring mechanism detects background light occurred upon irradiation of light onto the reference cell, and calculates the second particle size distribution on a basis of a change of background light intensity of the background light and a change of the scattered light intensity.

5. The particle size distribution measuring apparatus according to claim 3, wherein a rotation speed of the measurement cell during measurement of the second particle size distribution is lower than a rotation speed of the measurement cell during measurement of the first particle size distribution.

6. The particle size distribution measuring apparatus according to claim 2, wherein the first measurement end determination section makes a determination that the measurement of the first particle size distribution is terminated based on the transmitted light intensity or absorbance obtainable on a basis of the transmitted light intensity.

7. The particle size distribution measuring apparatus according to claim 1, wherein
each of the first particle size distribution and the second particle size distribution is indicated on a graph whose one axis is particle size and whose other axis is a ratio of particles for each particle size relative to a total of particles, and
the particle size distribution measuring apparatus further comprises a distribution composition section to create a composed particle distribution indicated on an identical graph by composing the first particle size distribution and the second particle size distribution.

8. The particle size distribution measuring apparatus according to claim 7, further comprising:
a particle concentration calculation section configured to calculate a concentration of particles having a particle size indicated on the first particle size distribution on a basis of the transmitted light intensity obtainable by the centrifugal sedimentation type measuring mechanism; and
a distribution conversion section configured to convert, on a basis of the concentration calculated by the particle concentration calculation section, a composed particle size distribution composed by the distribution composition section, from a distribution relatively indicating a number of particles for each particle size to a distribution absolutely indicating the number of particles for the each particle size.

9. The particle size distribution measuring apparatus according to claim 1, wherein the measurement cell accommodates a plurality of dispersion mediums which are stacked one upon another along a sedimentation direction and have densities different from one another.

10. The particle size distribution measuring apparatus according to claim 1, wherein the centrifugal sedimentation type measuring mechanism comprises a rotation mechanism with a rotating disk having a holder that receives the measurement cell, and both the first particle size distribution and the second particle size distribution are measured from the measurement cell received in the holder of the rotating disk.

11. A particle size distribution measuring method comprising using:
a centrifugal sedimentation type measuring mechanism designed to cause particles to settle out by rotating a measurement cell accommodating particles dispersed in a dispersion medium and measure a time during which a particle sinks down a predetermined distance by irradiating light to the particles and detecting transmitted light, wherein a first particle size distribution of the particles is measured on a basis of a change of transmitted light intensity of the transmitted light; and
a dynamic light scattering type measuring mechanism detecting scattered light occurred upon irradiation of light to particles to measure a second particle size distribution on a basis of a change of scattered light intensity of the scattered light occurred due to Brownian motion of particles, wherein
the second particle size distribution is measured by detecting the transmitted light with use of the centrifugal sedimentation type measuring mechanism, followed by irradiating light onto the measurement cell with use of the dynamic light scattering type measuring mechanism.

12. A non-transitory program medium storing a program applied to a particle size distribution measuring apparatus, the apparatus comprising:
a centrifugal sedimentation type measuring mechanism causing particles to settle out by rotating a measurement cell accommodating particles dispersed in a dispersion medium and measuring a time during which a particle sinks down a predetermined distance by irradiating light to the particles and detecting transmitted light, wherein a first particle size distribution of the particles is measured on a basis of a change of transmitted light intensity of the transmitted light; and
a dynamic light scattering type measuring mechanism detecting scattered light occurred upon irradiation of light to particles to measure a second particle size distribution on a basis of a change of scattered light intensity of the scattered light occurred due to Brownian motion of particles, wherein
the second particle size distribution is designed to be measured by detecting the transmitted light with use of the centrifugal sedimentation type measuring mechanism, followed by irradiating light onto the measurement cell with use of the dynamic light scattering type measuring mechanism, the program designed to cause a computer to perform functions that serve as:

a first measurement end determination section to make a determination whether measurement of the first particle size distribution is terminated, on a basis of the transmitted light intensity obtainable by the centrifugal sedimentation type measuring mechanism; and a second measurement start section to transmit, to the dynamic light scattering type measuring mechanism, a second measurement start signal for starting measurement of the second particle size distribution after the first measurement end determination section makes a determination that measurement of the first particle size distribution is terminated.

* * * * *